(12) United States Patent
Lee (10) Patent No.: US 10,663,009 B2
(45) Date of Patent: May 26, 2020

(54) SELF-CONTAINED SWITCHABLE WEDGE CLUTCH

(71) Applicant: Schaeffler Technologies AG & Co. KG, Herzogenaurach (DE)

(72) Inventor: Brian Lee, York, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/036,987

(22) Filed: Jul. 17, 2018

(65) Prior Publication Data

US 2020/0025261 A1   Jan. 23, 2020

(51) Int. Cl.
*F16D 13/16* (2006.01)
*F16D 13/26* (2006.01)
*F16D 15/00* (2006.01)

(52) U.S. Cl.
CPC ............. *F16D 13/16* (2013.01); *F16D 13/26* (2013.01); *F16D 15/00* (2013.01)

(58) Field of Classification Search
CPC ........... F16D 13/16; F16D 15/00; F16D 13/76
See application file for complete search history.

(56) References Cited

U.S. PATENT DOCUMENTS

| 9,644,690 B2* | 5/2017 | Lee | F16D 43/00 |
| 9,915,298 B2* | 3/2018 | Heravi | F16D 11/14 |
| 2003/0019708 A1* | 1/2003 | Goto | F16D 27/02 |
| | | | 192/35 |
| 2013/0248317 A1* | 9/2013 | Lee | F16D 13/40 |
| | | | 192/70.11 |
| 2015/0014113 A1* | 1/2015 | Ohr | F16D 13/14 |
| | | | 192/70.23 |

* cited by examiner

*Primary Examiner* — David J Hlavka
(74) *Attorney, Agent, or Firm* — Reid Baldwin (57) ABSTRACT

A self-contained switchable wedge plate clutch, consisting of: a housing arranged to receive rotational torque; and a clutch assembly. The clutch assembly includes: an outer race non-rotatably connected to the housing; an output hub; a plurality of circumferentially aligned wedge plate segments, enclosed by the housing, radially disposed about the output hub; and an activation assembly at least a portion of which is enclosed by the housing. The activation assembly is arranged to displace the plurality of circumferentially aligned wedge plate segments to switch the self-contained switchable wedge plate clutch between: a locked mode for the sell-contained switchable wedge plate clutch, in which the housing and the output hub are non-rotatably connected; and an unlocked mode for the self-contained switchable wedge plate clutch, in which the housing and the output hub are rotatable with respect to each other.

20 Claims, 10 Drawing Sheets

SELF-CONTAINED SWITCHABLE WEDGE CLUTCH

TECHNICAL FIELD

The present disclosure relates to a self-contained switchable wedge clutch.

BACKGROUND

It is desirable to have a self-contained wedge clutch that operates without oil lubrication from outside components.

SUMMARY

According to aspects illustrated herein, there is provided a self-contained switchable wedge plate clutch, consisting of: a housing arranged to receive rotational torque; and a clutch assembly. The clutch assembly includes: an outer race non-rotatably connected to the housing; an output hub; a plurality of circumferentially aligned wedge plate segments, enclosed by the housing, and radially disposed about the output hub; and an activation assembly at least a portion of which is enclosed by the housing. The activation assembly is arranged to displace the plurality of circumferentially aligned wedge plate segments to switch the self-contained switchable wedge plate clutch between: a locked mode for the self-contained switchable wedge plate clutch, in which the housing and the output hub are non-rotatably connected; and an unlocked mode for the self-contained switchable wedge plate clutch, in which the housing and the output hub are rotatable with respect to each other.

According to aspects illustrated herein, there is provided a self-contained switchable wedge plate clutch, consisting of: a housing including at least one first through-bore and a second through-bore; a space enclosed by the housing; and a clutch assembly. The clutch assembly includes: an outer race non-rotatably connected to the housing; an output hub at least a portion of which is disposed within the space and arranged to connect to an output shaft; a plurality of circumferentially aligned wedge plate segments, an entirety of which is located within the space and radially disposed between the outer race and the output hub; and an activation assembly including an activation component engaged with the plurality of circumferentially aligned wedge plate segments and at least a portion of which is located within the space. The activation assembly is arranged to displace the plurality of circumferentially aligned wedge plate segments to switch the self-contained switchable wedge plate clutch between: a locked mode for the self-contained switchable wedge plate clutch, in which the housing and the output hub are non-rotatably connected; and an unlocked mode for the self-contained switchable wedge plate clutch, in which the housing and the output hub are rotatable with respect to each other. An entirety of the output hub is disposed within the space and the output shaft is arranged to pass through the second through-bore; or the output hub includes a portion disposed in the second through-bore.

According to aspects illustrated herein, there is provided a self-contained switchable wedge plate clutch, consisting of: a housing including a first through-bore arranged to receive an input shaft, at least one second through-bore, and a third through-bore; and a clutch assembly. The clutch assembly includes: an input part arranged to connect to the input shaft; an outer race formed by the housing, the outer race including a plurality of first ramps and a plurality of second ramps; an output hub enclosed by the housing and arranged to non-rotatably connect to an output shaft passing through the third through-bore, or including a portion disposed in the third through-bore and arranged to non-rotatably connect to an output shaft; a plurality of circumferentially aligned wedge plate segments enclosed by the housing and including a plurality of first wedge plate segments, each first wedge plate segment including a third ramp in contact with a respective first ramp and a plurality of second wedge plate segments, each second wedge plate segment including a fourth ramp in contact with a respective second ramp; and an activation assembly including an activation component with a plurality of activation elements circumferentially interleaved with the plurality of circumferentially aligned wedge plate segments and extending through the at least one second through-bore, and a resilient element. The only openings in the housing are the first through-bore, the at least one second through-bore; and the third through-bore. To switch the self-contained switchable wedge plate clutch between a locked mode for the self-contained switchable wedge plate clutch, in which the housing and the output hub are non-rotatably connected, and an unlocked mode for the self-contained switchable wedge plate clutch, in which the housing and the output hub are rotatable with respect to each other: the resilient element is arranged to displace the activation component and the plurality of activation elements in a first axial direction parallel to an axis of rotation for the housing; and the activation component is arranged to receive a force from an actuator to displace the activation component and the plurality of activation elements in a second axial direction, opposite the first axial direction.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 10:
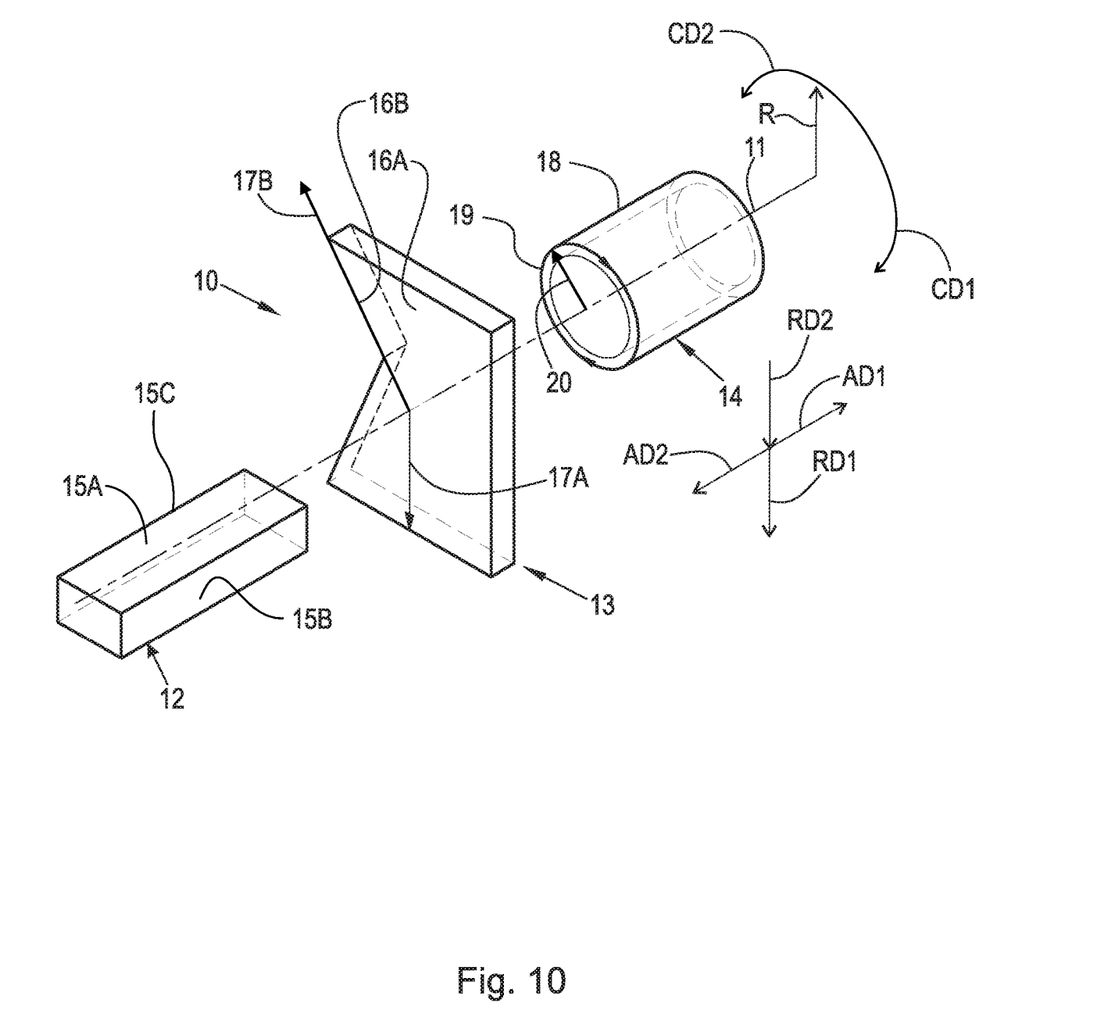
FIG. 10 is a perspective view of a cylindrical coordinate system demonstrating spatial terminology used in the present application.

FIG. 10 is a perspective view of cylindrical coordinate system 10 demonstrating spatial terminology used in the present application. The present application is at least partially described within the context of a cylindrical coordinate system. System 10 includes axis of rotation, or longitudinal axis, 11, used as the reference for the directional and spatial terms that follow. Opposite axial directions AD1 and AD2 are parallel to axis 11. Radial direction RD1 is orthogonal to axis 11 and away from axis 11. Radial direction RD2 is orthogonal to axis 11 and toward axis 11. Opposite circumferential directions CD1 and CD2 are defined by an endpoint of a particular radius R (orthogonal to axis 11) rotated about axis 11, for example clockwise and counterclockwise, respectively.

To clarify the spatial terminology, objects 12, 13, and 14 are used. As an example, an axial surface, such as surface 15A of object 12, is formed by a plane co-planar with axis 11. However, any planar surface parallel to axis 11 is an axial surface. For example, surface 15B, parallel to axis 11 also is an axial surface. An axial edge is formed by an edge, such as edge 15C, parallel to axis 11. A radial surface, such as surface 16A of object 13, is formed by a plane orthogonal to axis 11 and co-planar with a radius, for example, radius 17A. A radial edge is co-linear with a radius of axis 11. For example, edge 16B is co-linear with radius 17B. Surface 18 of object 14 forms a circumferential, or cylindrical, surface. For example, circumference 19, defined by radius 20, passes through surface 18.

Axial movement is in axial direction AD1 or AD2. Radial movement is in radial direction RD1 or RD2. Circumferential, or rotational, movement is in circumferential direction CD1 or CD2. The adverbs "axially," "radially," and "circumferentially" refer to movement or orientation parallel to axis 11, orthogonal to axis 11, and about axis 11, respectively. For example, an axially disposed surface or edge extends in direction AD1, a radially disposed surface or edge extends in direction RD1, and a circumferentially disposed surface or edge extends in direction CD1.

Figure 1:
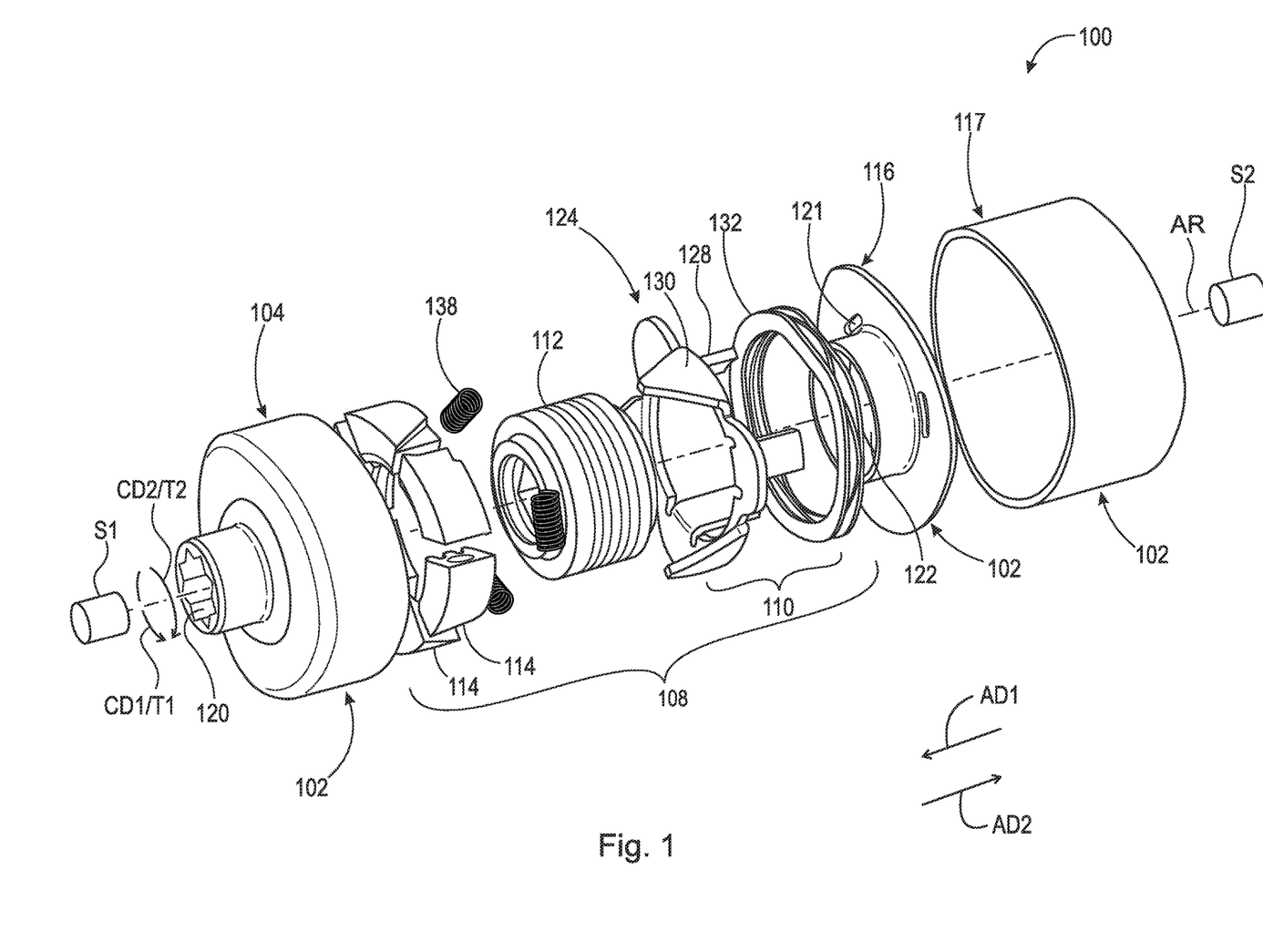
FIG. 1 is a front exploded view of a self-contained switchable wedge clutch.

FIG. 1 is an exploded view of example self-contained switchable wedge clutch 100.

Figure 2:
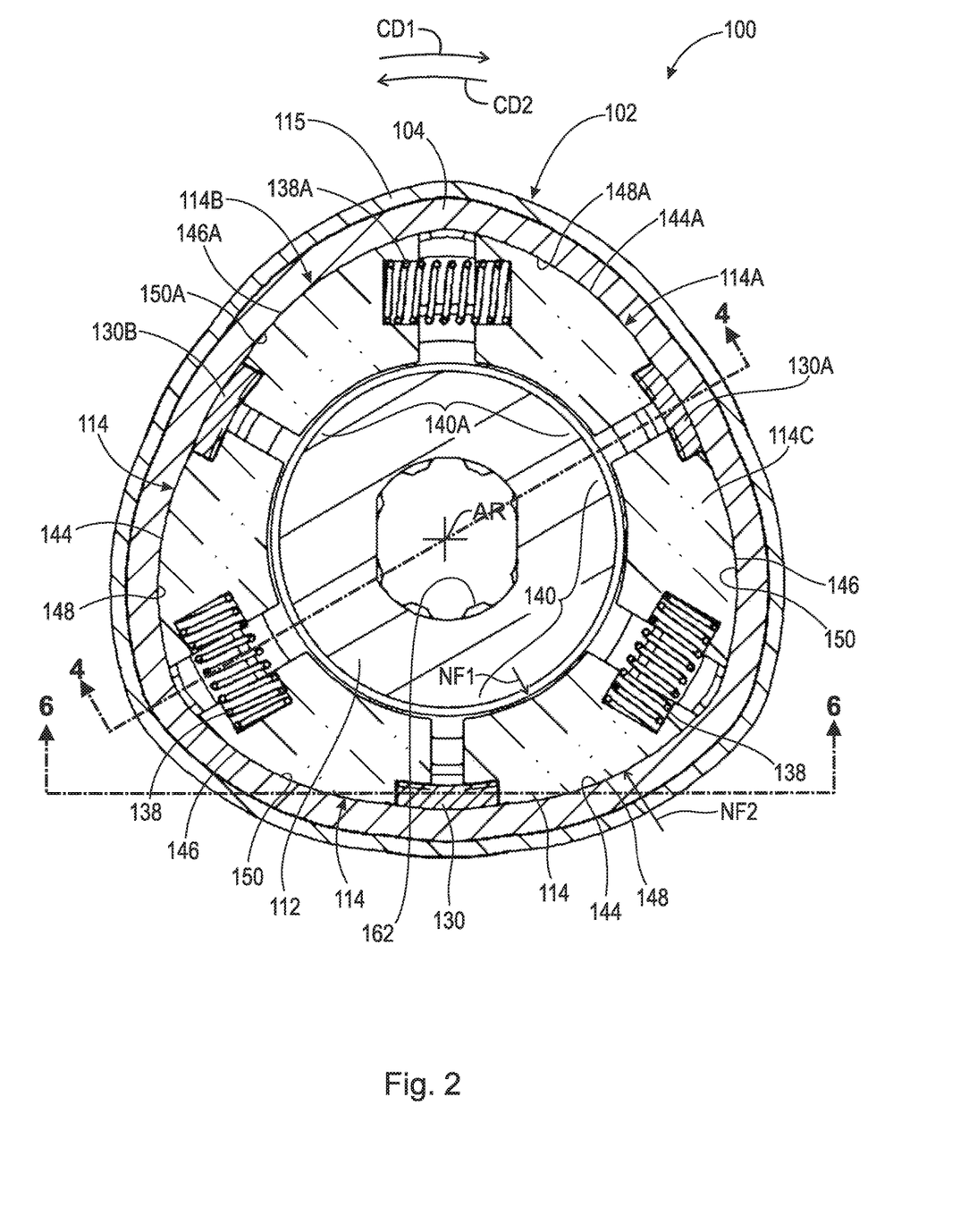
FIG. 2 is a radial cross-sectional view of the switchable wedge clutch shown in FIG. 1 in an unlocked mode.

FIG. 2 is a radial cross-sectional view of switchable wedge clutch 100 shown in FIG. 1 in an unlocked mode.

Figure 3:
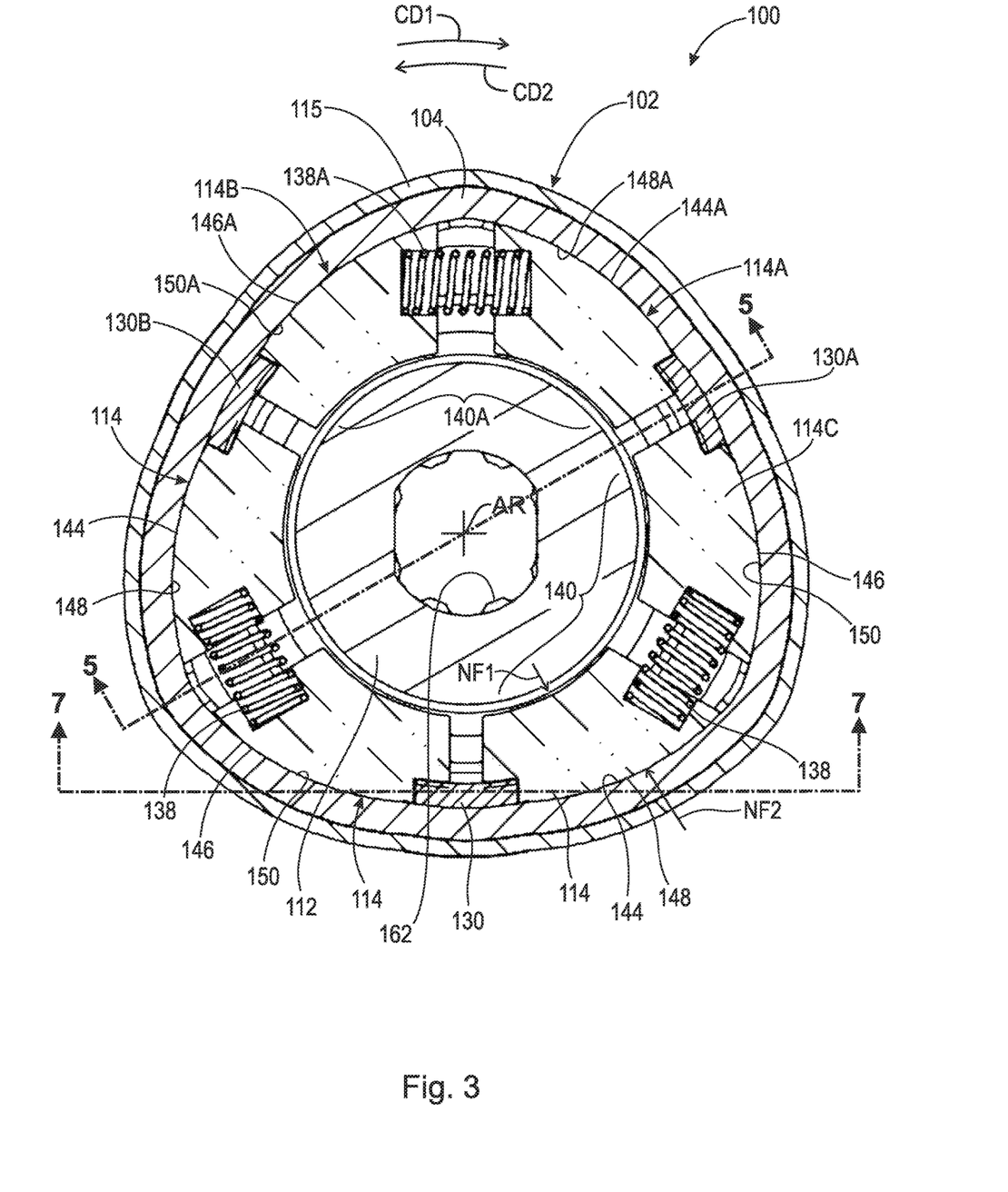
FIG. 3 is a radial cross-sectional view of the switchable wedge clutch shown in FIG. 1 in a locked mode.

FIG. 3 is a radial cross-sectional view of switchable wedge clutch 100 shown in FIG. 1 in a locked mode.

Figure 4:
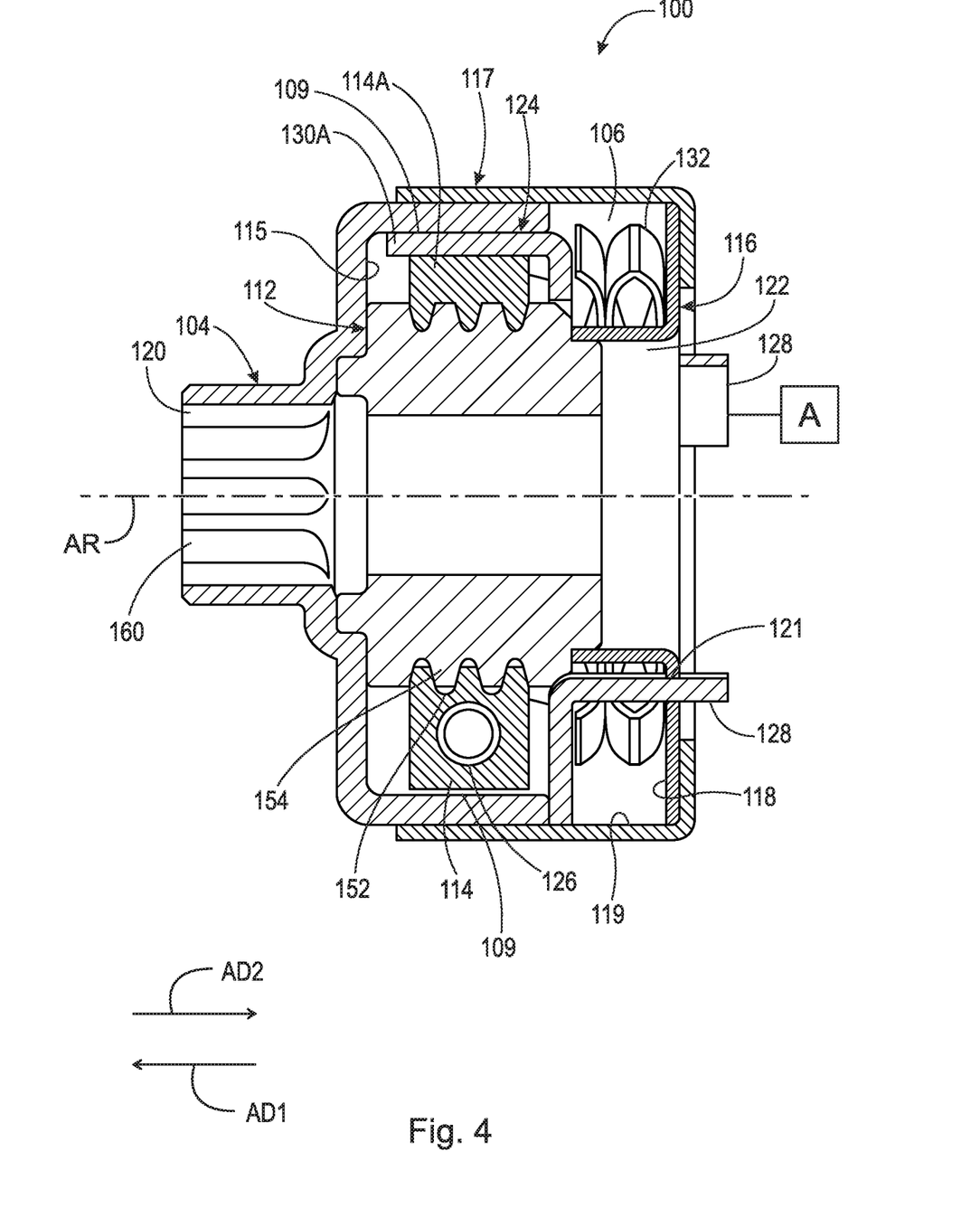
FIG. 4 is cross-sectional view generally along line 4-4 in FIG. 2.

FIG. 4 is cross-sectional view generally along line 4-4 in FIG. 2.

Figure 5:
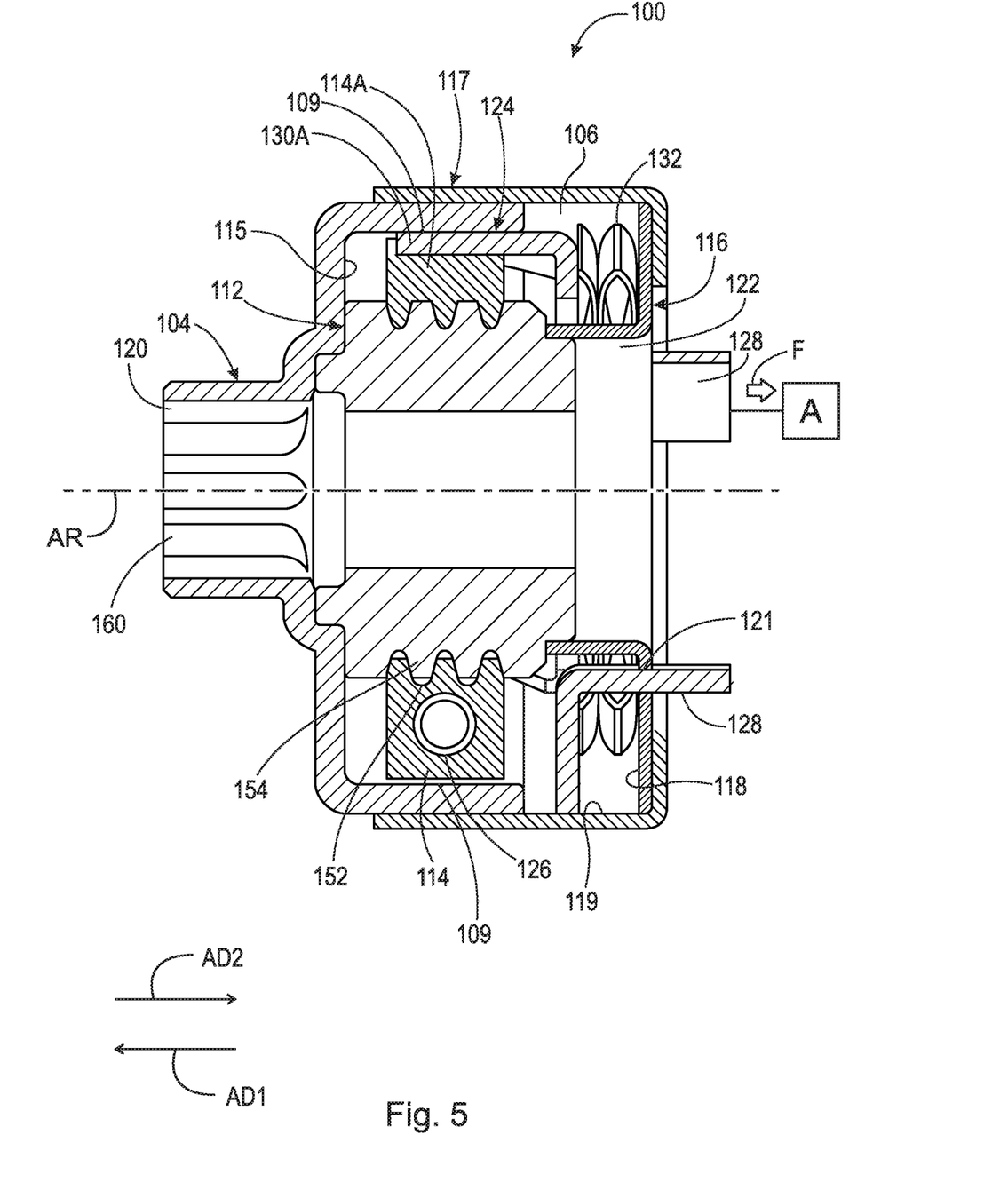
FIG. 5 is cross-sectional view generally along line 5-5 in FIG. 3.

FIG. 5 is cross-sectional view generally along line 5-5 in FIG. 3. The following should be viewed in light of FIGS. 1 through 5. It should understood that the difference between circumferential positions of elements shown in FIGS. 2 and 3 is relatively small and may not be readily apparent in FIGS. 2 and 3. Switchable wedge plate clutch 100 includes: axis of rotation AR; housing 102 including input part 104; space 106 enclosed by housing 102; and clutch assembly 108. Clutch assembly 108 includes: outer race 109 non-rotatably connected to housing 102; activation assembly 110; output hub 112; and circumferentially aligned wedge plate segments 114. Housing 102, for example input part 104, is arranged to receive rotational torque T1 or T2 in opposite circumferential directions CD1 and CD2, respectively. By "non-rotatably connected" components, we mean that: the components are connected so that whenever one of the components rotates, all the components rotate; and relative rotation between the components is not possible. Radial and/or axial movement of non-rotatably connected components with respect to each other is possible, but not required.

Segments 114 are radially disposed about output hub 112 radially between outer race 109 and output hub 112. In an example embodiment, output hub 112 is enclosed by housing 102. By "enclosed by housing 102," we mean the item enclosed by housing 102 is located in space 106 and does not extend beyond housing 102 in any direction. Segments 114 are enclosed by housing 102. In an example embodiment, an entirety of circumferentially aligned wedge plate segments 114 is located within space 106. In an example embodiment, outer race 109 is formed by, or is integral to housing 102. For example, outer race 109 is formed by inner surface 115 of input part 104. In an example embodiment, every element of self-contained switchable wedge plate clutch 100, rotatable with respect to housing 102, is enclosed by housing 102. For example, at least a portion of hub 112 and segments 114 are located in space 106, and no portions of hub 112 and segments 114 extend beyond housing 102 in axial directions AD1 or AD2.

Figure 6:
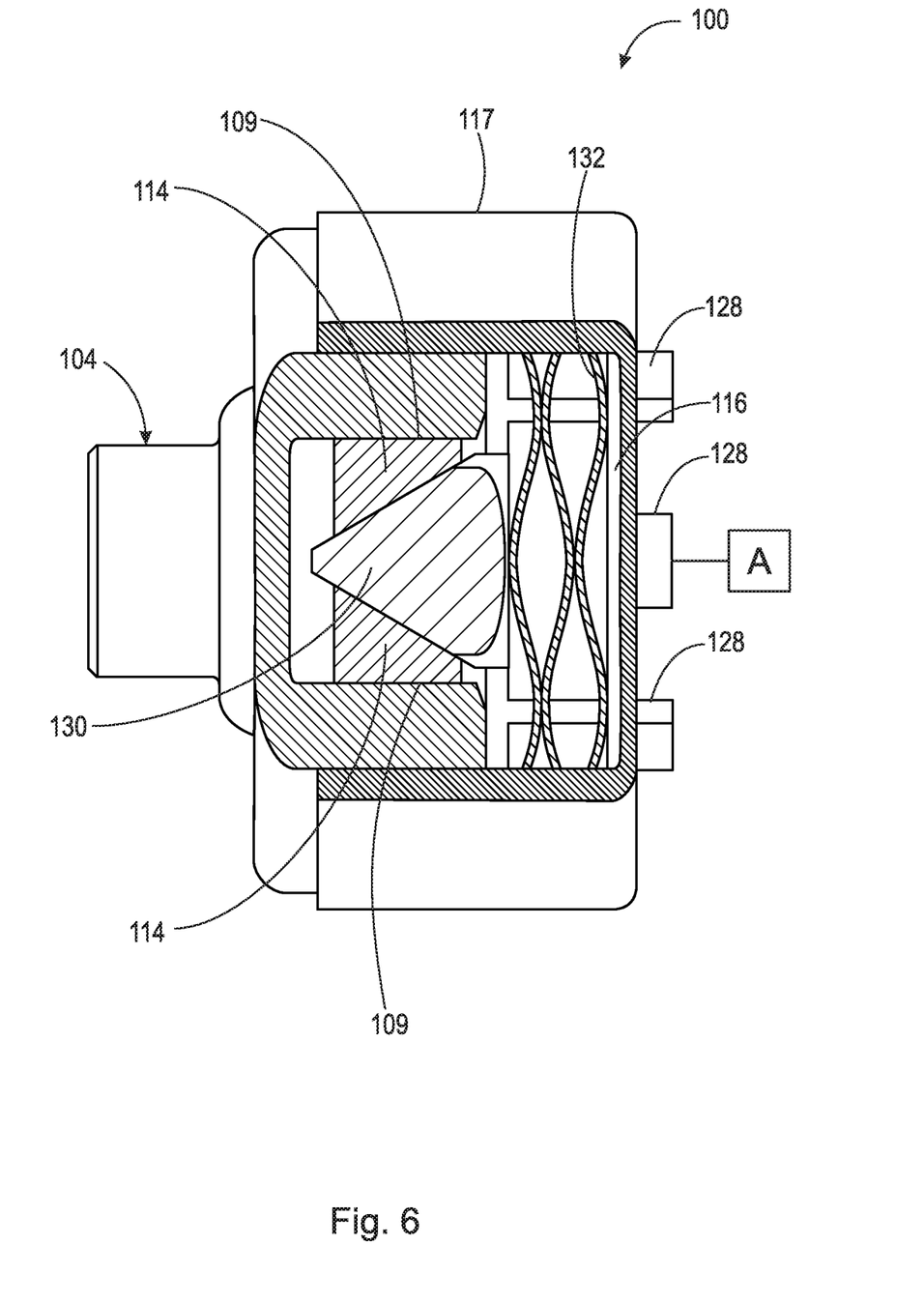
FIG. 6 is cross-sectional view generally along line 6-6 in FIG. 2.
Figure 7:
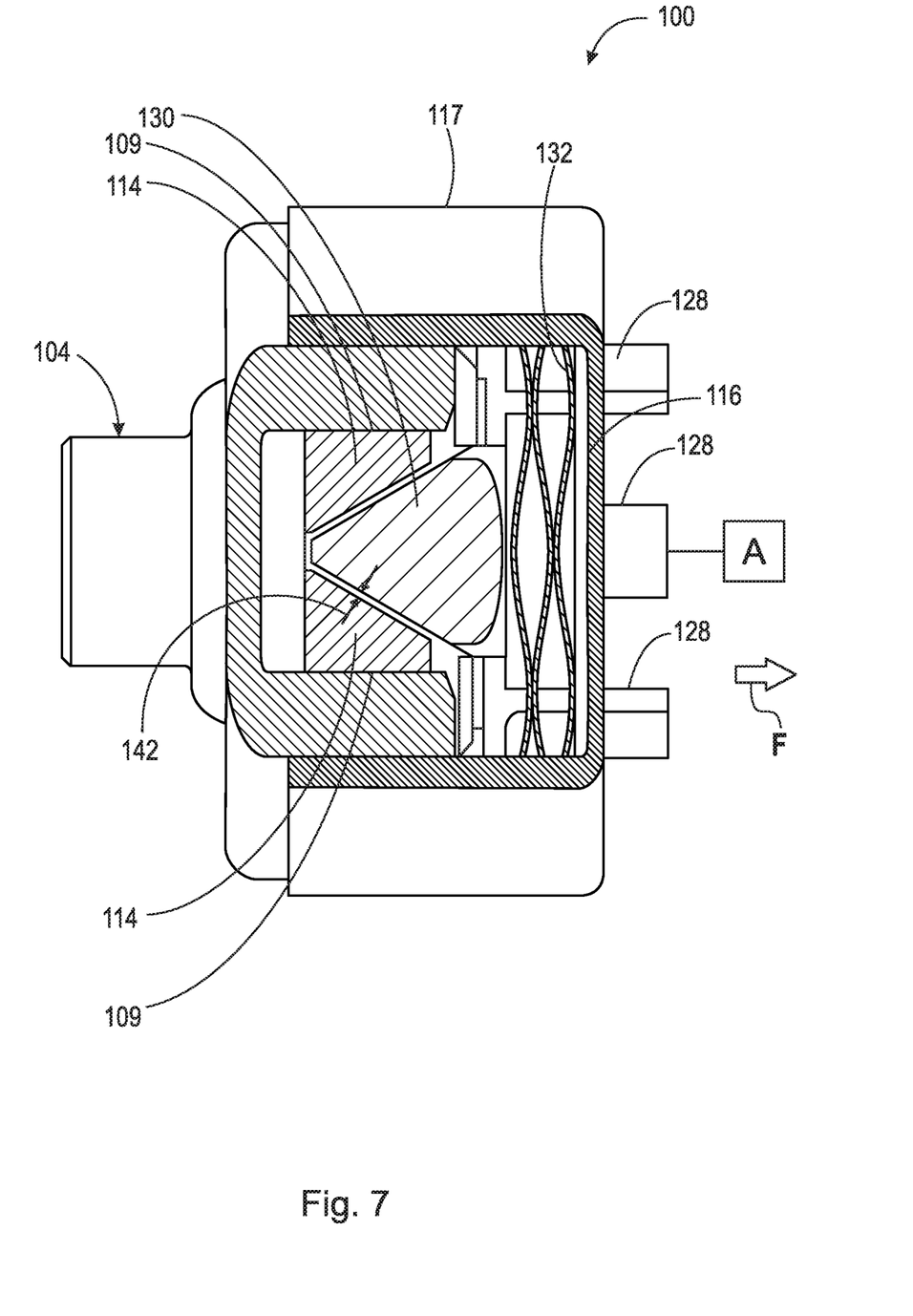
FIG. 7 is cross-sectional view generally along line 7-7 in FIG. 3.

FIG. 6 is cross-sectional view generally along line 6-6 in FIG. 2;

FIG. 7 is cross-sectional view generally along line 7-7 in FIG. 3. The following should be viewed in light of FIGS. 1 through 7. As further described below, activation assembly 110 is arranged to displace circumferentially aligned wedge plate segments 114 to switch between a locked mode for self-contained switchable wedge plate clutch 100 and an unlocked mode for self-contained switchable wedge plate clutch 100. In the locked mode, housing 102 and output hub 112 are non-rotatably connected. In the unlocked mode, housing 102 and output hub 112 are rotatable with respect to each other. In an example embodiment, in the unlocked mode, circumferentially aligned wedge plate segments 114 are rotatable with respect to output hub 112 and rotate with housing 102.

In an example embodiment: housing 102 consists of input part 104, end plate 116, and sleeve 117; and space 106 is enclosed, or bounded, by inner surface 115 of input part 104, inner surface 118 of end plate 116; and inner surface 119 of sleeve 117. Input part 104 and end plate 116 are non-rotatably connected to sleeve 117. In an example embodiment: input part 104 includes through-bore 120; and end plate 116 includes at least one through-bore 121, and through-bore 122. In an example embodiment: housing 102 includes multiple through-bores 121. In an example embodiment, the only openings through housing 102 are through-bore 120; through-bores 121; and through-bore 122. By an "opening through housing 102," we mean the opening passes through the housing and may continue on to space 106. It should be understood that a component of clutch assembly 108 can be disposed in an opening in housing 102.

Through-bore 120 is arranged to receive input shaft S1 (schematically shown in FIG. 1). Through-bore 122 is arranged to receive output shaft S2 (schematically shown in FIG. 1). Output hub 112 is arranged to non-rotatably connect to output shaft S2.

In an example embodiment, activation assembly 110 includes activation component 124 engaged with segments 114. Component 124 includes: portion 128 extending through through-bores 121; and engagement elements 130. Engagement elements 130 are enclosed by housing 101. Elements 130 are circumferentially interleaved with circumferentially aligned wedge plate segments 114. Component 124 is arranged to be displaced, for example in axial directions AD1 and AD2, to switch self-contained torque-limiting switchable wedge plate clutch 100 between the locked mode and the unlocked mode. As further described below, component 124 is displaceable in axial directions AD1 and AD2 to displace circumferentially aligned wedge plate segments 114 to switch self-contained torque-limiting switchable wedge plate clutch 100 between the locked mode and the unlocked mode. In the example of FIG. 1, the only openings through housing 102 into space 106 are through-bores 120, 121, and 122.

In an example embodiment, activation assembly 110 includes resilient element 132. Resilient element 132 is enclosed by housing 101. In an example embodiment, an entirety of resilient element 132 is located in space 106. Resilient element 132 is arranged to urge component 124 in axial direction AD1.

As further described below to switch clutch 100 from the locked mode to the unlocked mode: element 132 displaces component 124 and elements 130 in axial direction AD1; elements 130 displace circumferentially aligned wedge plate segments 114 circumferentially; and elements 130 displace circumferentially aligned wedge plate segments 114 radially outwardly.

As further described below to switch clutch 100 from the unlocked mode to the locked mode: component 124, in particular portion 128, is arranged to receive force F, in axial direction AD2, from actuator A; component 124 and elements 130 displace in axial direction AD2. Actuator A can be any actuator known in the art.

In an example embodiment, activation assembly 110 is non-rotatably connected to housing 102. For example, component 124 and resilient element 132 are non-rotatably connected to housing 101. In an example embodiment, clutch 100 is a bi-directional clutch. That is, clutch 100 is operable in the locked mode for torque T1 and torque T2. For example, in the locked mode: input part 104 transmits torque T1 to output hub 112; or input part 104 transmits torque T2 to output hub 112.

In an example embodiment, clutch assembly 108 includes: resilient elements 138; and pairs 140 of segments 114. Each resilient element 138: is circumferentially disposed between the segments 114 for a respective pair 140; and urges the segments 114 for the respective pair 140 circumferentially away from each other. For example, element 138A is circumferentially disposed between segments 114A and 114B for pair 140A, and element 138A urges segment 114A in circumferential direction CD1 and segment 114B in circumferential direction CD2, opposite direction CD1. As further described below, displacing segments 114 for a respective pair 140 circumferentially away from each other transitions clutch 100 from the unlocked mode to the locked mode. In the discussion that follows, letters are used to designate a specific component from a group of components otherwise designated by a three-digit number, for example, in the discussion above, segments 114A and 114B are specific examples of segments 114.

Elements 130 extend in direction AD1. Each pair 140 is circumferentially bracketed by two respective elements 130. Displacing, with resilient element 132, component 124 and elements 130 in axial direction AD1 displaces segments 114 for each pair 140 circumferentially toward each other and against the urging of resilient elements 138. For example: elements 130A and 130B circumferentially bracket pair 140A; and displacing component 124 in direction AD1: causes element 130A to displace segment 114A in direction CD2 circumferentially toward segment 114B and to displace segment 114C in direction CD1; and causes element 130B to displace segment 114B in direction CD1 toward segment 114A. Segments 114A and 114B are displaced toward each other against the urging of element 138A. Displacing respective segments 114 for circumferentially adjacent pairs 140 circumferentially toward each other transitions clutch 100 from the locked mode to the unlocked mode. In an example embodiment, elements 130 are free of contact with segments 114 in the unlocked mode. For example, gap 142 is formed between elements 130 and segments 114.

In an example embodiment, to transition from the locked mode to the unlocked mode, resilient element 132 displaces component 124 in axial direction AD1 and engagement elements 130 circumferentially displace segments 114 radially outwardly to reduce, minimize, or eliminate frictional contact between output hub 112 and wedge plate segments 114.

In an example embodiment, to transition from the unlocked mode to the locked mode: actuator A is arranged to displace component 124 in axial direction Ad2 to disengage engagement elements 130 from segments 114; and resilient elements 138 displace circumferentially displace segments 114 radially inwardly to initiate or increase frictional contact between output hub 112 and wedge plate segments 114. For example, displacing component 124 in direction ADZ causes elements 130A and 130B to withdraw from around pair 140A, enabling element 138A to displace segments 114A and 114B in directions CD1 and CD2, respectively.

In an example embodiment, input part 104 includes ramps 144 and 146; for each pair 140, one segment 114 includes ramp 148 and the other segment 114 includes ramp 150; hub 112 includes at least one circumferential groove 152; and each segment 114 includes at least one protrusion 154 at least partially disposed in at least one groove 152. Ramps 144 and 148 are in contact and slope radially inwardly in direction CD1. Ramps 146 and 150 are in contact and slope radially inwardly in direction CD2. For example, segment 114A includes ramp 148A in contact with ramp 144A and segment 114B includes ramp 150A in contact with ramp 146A.

The following provides further detail regarding example clutch 100. To transition from the unlocked mode to the locked mode for relative rotation of input part 104, with respect to output hub 112, in direction CD1: actuator A displaces component 124 and elements 130 in axial direction AD2; and elements 130 are withdrawn from between pairs 140. Resilient elements 138 force the segments 114 in each pair 140 radially inwardly and circumferentially apart from each other. Thus, resilient elements 138 slide, or push: ramps 148 radially inwardly along ramps 144 in direction CD1; and ramps 150 radially inwardly along ramps 146 in direction CD2. Segments 114 with ramps 148 frictionally engage hub 112 or increase existing frictional engagement with hub 112 (via protrusions 154 in grooves 152) and rotate with hub 112, and with respect to input part 104, in direction CD1. Segments 114 with ramps 150 frictionally engage hub 112 or increase existing frictional engagement with hub 112 (via protrusions 154 in grooves 152) and rotate with hub 112 and with respect to input part 104 in direction CD1.

The relative rotation in direction CD1 and frictional engagement noted above: causes ramps 148 to slide radially inwardly along ramps 144; compressively engages segments 114 with ramps 148 between hub 112 and outer race 109; and non-rotatably connects segments 114 with ramps 148 with hub 112 and input part 104. By components "compressively engaged between" two elements, we mean that: one element, for example hub 112, exerts a normal force on the component, for example, normal force NF1 on segments 114; and the other element, for example, housing 102 and race 109 (via ramps 144 and 146), exerts an opposite normal force on the component, for example normal force NF2 on segments 114. Thus, the two elements squeeze and lock the component between them.

The relative rotation in direction CD1 and frictional engagement note above cause ramps 150 to slide radially outwardly along ramps 146. Thus, segments 114 with ramps 150 are not compressively engaged between hub 112 and race 109 and are not non-rotatably connected with hub 112 and input part 104. Once in the locked mode, input part 104, hub 112, and segments 114 with ramps 148 rotate together in direction CD1. As long as component 124 remains displaced in direction AD2 and elements 130 remain out of contact with segments 114, clutch 100 remains in the locked mode regardless of the direction of torque applied to clutch 100 or a direction of rotation of hub 112 and input part 104. For example, if the torque changes to T2 in direction CD2, compressive engagement of race 109, hub 112, and segments 114 shifts to segments 114 with ramps 150 generally as described below for the transition from the unlocked mode to the locked mode for relative rotation of input part 104, with respect to output hub 112, in direction CD2.

To transition from the locked mode involving segments 114 with ramps 148, to the unlocked mode: actuator A is de-activated; resilient element 132 displaces component 124 in direction AD1; and elements 130 push segments 114 with ramps 148 radially outwardly away from hub 112 to reduce or eliminate frictional contact between hub 112 and segments 114 with ramps 148.

To transition from the unlocked mode to the locked mode for relative rotation of input part 104, with respect to output hub 112, in direction CD2: actuator A displaces component 124 and elements 130 in axial direction AD2; and elements 130 are withdrawn from between pairs 140. Resilient elements 138 force the segments 114 in each pair 140 radially inwardly and circumferentially apart from each other. Thus, resilient elements 138 slide, or push: ramps 150 radially inwardly along ramps 146 in direction CD2; and ramps 148 radially inwardly along ramps 144 in direction CD1. Segments 114 with ramps 150 frictionally engage hub 112 or increase existing frictional engagement with hub 112 (via protrusions 154 in grooves 152) and rotate with hub 112 and with respect to input part 104 in direction CD2. Segments 114 with ramps 148 frictionally engage hub 112 or increase existing frictional engagement with hub 112 (via protrusions 154 in grooves 152) and rotate with hub 112 and with respect to input part 104 in direction CD2.

The relative rotation in direction CD2 and frictional engagement noted above: causes ramps 150 to slide radially inwardly along ramps 146; compressively engages segments 114 with ramps 150 between hub 112 and race 109; and non-rotatably connects segments 114 with ramps 150 with hub 112 and input part 104.

The relative rotation in direction CD2 and frictional engagement note above causes ramps 148 to slide radially outwardly along ramps 144. Thus, segments 114 with ramps 148 are not compressively engaged between hub 112 and race 109 and are not non-rotatably connected with hub 112 and input part 104. Once in the locked mode, input part 104, hub 112, and segments 114 with ramps 150 rotate together in direction CD2. As long as component 124 remains displaced in direction AD2 and elements 130 remain out of contact with segments 114, clutch 100 remains in the locked mode regardless of the direction of torque applied to clutch 100 or a direction of rotation of hub 112 and input part 104. For example, if the torque changes to T1 in direction CD1, compressive engagement of race 109, hub 112, and segments 114 shifts to segments 114 with ramps 148 generally as described above for the transition from the unlocked mode to the locked mode for relative rotation of input part 104, with respect to output hub 112, in direction CD1.

To transition from the locked mode involving segments 114 with ramps 150, to the unlocked mode: actuator A is de-activated; resilient element 132 displaces component 124 in direction AD1; and elements 130 push segments 114 with ramps 150 radially outwardly away from hub 112 to reduce or eliminate frictional contact between hub 112 and segments 114 with ramps 150.

In an example embodiment, every element of clutch assembly 108: transmits torque T1 or T2 in the locked configuration; or is arranged to displace segments 114. Thus, assembly 108 consists of: inner surface 115 of input part 104; segments 114; resilient elements 138; component 124; output hub 112; and resilient element 132.

Figure 8:
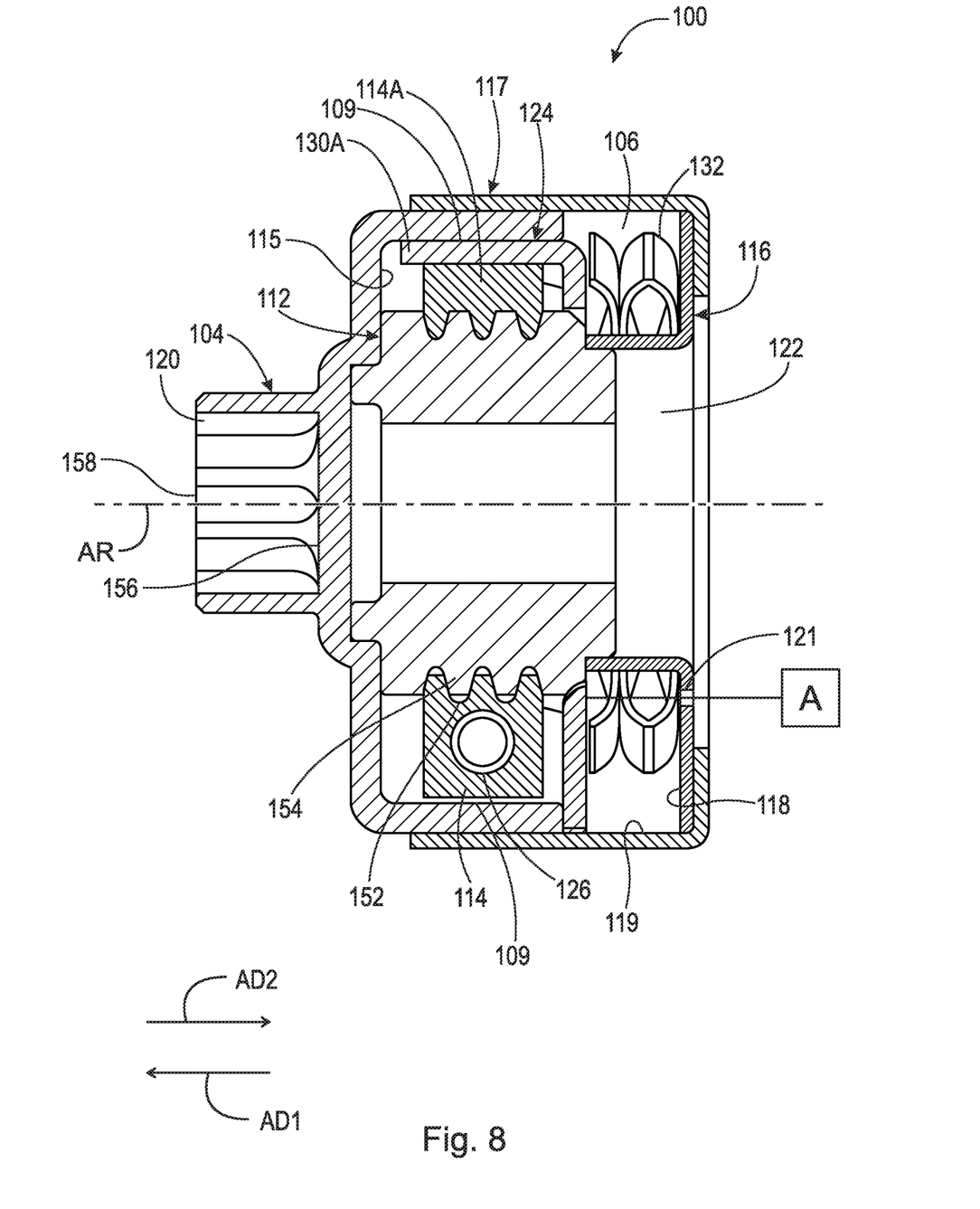
FIG. 8 is a variation of FIG. 4.

FIG. 8 is a variation of FIG. 4. The following should be viewed in light of FIGS. 1 through 8. The discussions for FIGS. 1 through 7 are applicable to FIG. 8 except as noted. In the example of FIG. 8, housing 102, for example, input part 104, includes wall 156, which blocks through-bore 120, creating indentation 158 arranged to receive input shaft S1. In the example of FIG. 8, component 124 does not include portion 128 extending through through-bores 121. Instead, actuator A extends through through-bores 121 and connects to activation component 124. Note that: wall 156 can be present with portions 128 in place; and actuator A can extend through through-bores 121 with through-bore 120 in place. In the example of FIG. 8, the only openings in or through housing 102 are: through-bores 121; and through-bore 122.

In an example embodiment: through-bore 120 includes splines 160 arranged to non-rotatably connect housing 102 and input shaft S1; and output hub 112 includes splines 162 arranged to non-rotatably connect hub 112 and output shaft S2.

Figure 9:
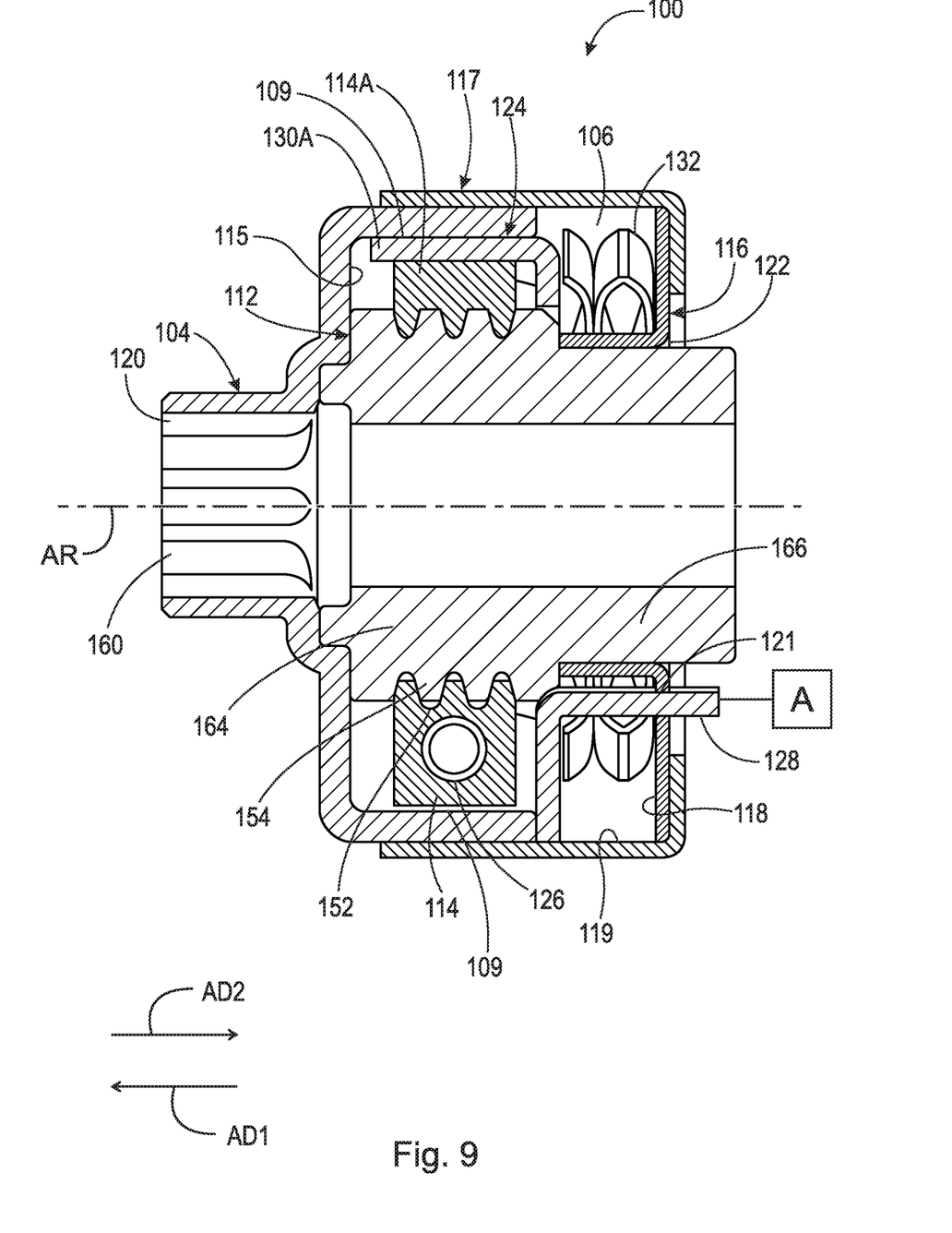
FIG. 9 is a variation of FIG. 4.

FIG. 9 is a variation of FIG. 4. The following should be viewed in light of FIGS. 1 through 7 and 9. The discussions for FIGS. 1 through 7 are applicable to FIG. 8 except as noted. In the example of FIG. 9: portion 164 of output hub 112 is disposed within housing 102; and portion 166 of output hub 112 is disposed in through-bore 122. In the example of FIG. 9, portion 166 extends past housing 102 in direction AD2. In the example of FIG. 9, the only openings in or through housing 102 are: through-bore 120; through-bores 121; and through-bore 122.

It should be understood that clutch 100 is not limited to the configuration shown in FIGS. 1 through 9. Further, any combination of the respective structures shown in FIGS. 1 through 9 are possible. For example: different numbers of segments 114 can be used; a different radial cross-sectional shape for housing 102 can be used; the position and functions of elements 130 and resilient elements 138 can be reversed; the directions of force for resilient element 132 and actuator A can be reversed; and ramps can be located on hub 112 and the radially inner surfaces of segments 114 with resilient elements 138 or elements 130 displacing segments 114 radially outwardly.

Clutch 100 is self-contained and can be installed as a complete, stand-alone component in a larger system, for example, in a tail gate assembly. For example, every component of clutch assembly 108 is partially or wholly contained within space 106 of housing 102. There is no need to add any further components to complete clutch 100. Thus, once connection to actuator A is made: housing 102 is ready to receive input torque, for example from input shaft S1; and output hub 112 is ready to transmit torque, for example to output shaft S2.

Further, being self-contained, clutch 100: can include and retain any lubrication needed, independent of the larger assembly into which clutch 100 is installed; and can be isolated from undesirable elements of the larger assembly into which clutch 100 is installed. In an example embodiments (not shown): clutch 100 includes seals around through-bores 121 to more complete isolate space 106.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS 10 cylindrical system
11 axis of rotation
AD1 axial direction
AD2 axial direction
RD1 radial direction
RD2 radial direction
CD1 circumferential direction
CD2 circumferential direction
R radius
12 object
13 object
14 object
15A surface
15B surface
15C edge
16A surface
16B edge
17A radius
17B radius
18 surface
19 circumference
20 radius
A actuator
AR axis of rotation
F force
NF1 normal force
NF2 normal force
S1 input shaft
S2 output shaft
T1 rotational torque
T2 rotational torque
100 self-contained switchable wedge clutch
102 housing
104 input part
106 space in housing
108 clutch assembly
109 outer race
110 activation assembly
112 output hub
114 circumferentially aligned wedge plate segments
114A circumferentially aligned wedge plate segments
114B circumferentially aligned wedge plate segments
115 inner surface, input part
116 end plate, housing
117 sleeve, housing
118 inner surface, end plate
119 inner surface, sleeve
120 through-bore
121 through-bore
122 through-bore
124 component, activation assembly
128 portion, component
130 engagement elements, portion 126
130A engagement element, portion 126
130B engagement element, portion 126
132 resilient element, activation assembly
138 resilient element, clutch assembly
138A resilient element, clutch assembly
140 pair of segments 114
140A pair of segments 114
142 gap
144 ramp, outer race
144A ramp, outer race
146 ramp, outer race
146A ramp, outer race
148 ramp, segment 114
148A ramp, segment 114
150 ramp, segment 114
150A ramp, segment 114
152 groove
154 protrusion
156 wall
158 indentation
160 spline
162 spline
164 portion, output hub
166 portion, output hub

The invention claimed is:

1. A self-contained switchable wedge plate clutch, consisting of:
a housing arranged to receive rotational torque; and,
a clutch assembly including:
an outer race non-rotatably connected to the housing;
an output hub;
a plurality of circumferentially aligned wedge plate segments:
enclosed by the housing; and,
radially disposed about the output hub; and,
an activation assembly, at least a portion of which is enclosed by the housing, wherein:
the activation assembly is arranged to displace the plurality of circumferentially aligned wedge plate segments to switch the self-contained switchable wedge plate clutch between:
a locked mode for the self-contained switchable wedge plate clutch, in which the housing and the output hub are non-rotatably connected; and,
an unlocked mode for the self-contained switchable wedge plate clutch, in which the housing and the output hub are rotatable with respect to each other.

2. The self-contained switchable wedge plate clutch of claim 1, wherein the housing includes the outer race.

3. The self-contained switchable wedge plate clutch of claim 1, further comprising a space enclosed by the housing, wherein:

at least a portion of every element of the self-contained switchable wedge plate clutch, rotatable with respect to the housing, is located in the space; and,
no portion of said every element of the self-contained switchable wedge plate clutch, rotatable with respect to the housing, extends beyond the housing.

4. The self-contained switchable wedge plate clutch of claim 1, wherein:
the housing includes at least one first through-bore; and,
the activation assembly includes an activation component extending through the at least one first through-bore; or,
the activation assembly is arranged to connect to an actuator through the at least one first through-bore.

5. The self-contained switchable wedge plate clutch of claim 1, wherein:
the housing includes:
at least one first through-bore; and,
a second through-bore;
the output hub includes:
a portion disposed within the housing; and,
a portion disposed in the second through-bore;
the only openings through the housing are the at least one first through-bore and the second through-bore; and,
the activation assembly includes an activation component extending through the at least one first through-bore, at least a portion of the activation component is located within the housing, and the activation component is arranged to receive a force from an actuator to switch the self-contained switchable wedge plate clutch between the locked mode and the unlocked mode; or,
the activation assembly is arranged to connect to an actuator through the at least one first through-bore, and the activation assembly is arranged to receive a force from the actuator to switch the self-contained switchable wedge plate clutch between the locked mode and the unlocked mode.

6. The self-contained switchable wedge plate clutch of claim 1, wherein:
the housing includes an input part;
the input part includes a first through-bore arranged to receive an input shaft transmitting the rotational torque;
the housing includes:
at least one second through-bore; and,
a third through-bore arranged to receive an output shaft;
the output hub is arranged to non-rotatably connect to the output shaft;
the only openings through the housing are the first through-bore, the at least one second through-bore, and the third through-bore; and,
the activation assembly includes an activation component extending through the first through-bore, at least a portion of the activation component is located within the housing, and the activation component is arranged to receive a force from an actuator to switch the self-contained switchable wedge plate clutch between the locked mode and the unlocked mode; or,
the activation assembly is arranged to connect to an actuator through the first through-bore, and the activation assembly is arranged to receive a force from the actuator to switch the self-contained switchable wedge plate clutch between the locked mode and the unlocked mode.

7. The self-contained switchable wedge plate clutch of claim 1, wherein:

the housing includes an input part;
the input part includes a first through-bore arranged to receive an input shaft transmitting the rotational torque;
the housing includes:
at least one second through-bore; and,
a third through-bore;
the output hub includes:
a portion disposed within the housing; and,
a portion disposed in the third through-bore;
the only openings through the housing are the first through-bore, the at least one second through-bore and the third through-bore; and,
the activation assembly includes an activation component extending through the first through-bore, at least a portion of the activation component is located within the housing, and the activation component is arranged to receive a force from an actuator to switch the self-contained switchable wedge plate clutch between the locked mode and the unlocked mode; or,
the activation assembly is arranged to connect to an actuator through the first through-bore, and the activation assembly is arranged to receive a force from the actuator to switch the self-contained switchable wedge plate clutch between the locked mode and the unlocked mode.

8. The self-contained switchable wedge plate clutch of claim 1, wherein:
the activation assembly includes an activation component with a plurality of engagement elements;
the plurality of engagement elements is enclosed by the housing;
the plurality of engagement elements is circumferentially interleaved with the plurality of circumferentially aligned wedge plate segments;
the activation component is displaceable to displace the plurality of engagement elements;
the housing includes an input part;
the input part includes a first through-bore arranged to receive an input shaft transmitting the rotational torque;
the housing includes:
at least one second through-bore; and,
a third through-bore;
the output hub is arranged to non-rotatably connect to an output shaft;
an entirely of the output hub is disposed within the housing and the output shaft passes through the third through-bore, or the output hub includes a portion disposed within the housing and the output hub includes a portion disposed in the third through-bore and arranged to non-rotatably connect to the output shaft;
the activation component includes a portion extending through the at least one second through-bore;
the portion is arranged to receive a force from an actuator to displace the plurality of engagement elements;
the plurality of engagement elements is arranged to circumferentially displace the plurality of circumferentially aligned wedge plate segments to switch the self-contained switchable wedge plate clutch between the locked mode and the unlocked mode; and,
the only openings in the housing are the first through-bore, the at least one second through-bore, and the third through-bore.

9. The self-contained switchable wedge plate clutch of claim 8, wherein the plurality of engagement elements is arranged to displace the plurality of circumferentially aligned wedge plate segments radially outwardly to switch the self-contained switchable wedge plate clutch from the locked mode to the unlocked mode.

10. The self-contained switchable wedge plate clutch of claim 8, further comprising a space enclosed by the housing, wherein:
the activation assembly includes a resilient element and an activation component;
an entirety of the resilient element is located within the space; and,
the resilient element is arranged to displace the activation component to:
circumferentially displace the plurality of circumferentially aligned wedge plate segments;
displace the plurality of circumferentially aligned wedge plate segments radially outwardly; and,
switch the self-contained switchable wedge plate clutch between the unlocked mode and the locked mode.

11. The self-contained switchable wedge plate clutch of claim 1, wherein:
the activation assembly is non-rotatably connected to the housing; or,
in the unlocked mode, the plurality of circumferentially aligned wedge plate segments is rotatable with respect to the output hub.

12. The self-contained switchable wedge plate clutch of claim 1, wherein:
the clutch assembly includes a plurality of resilient elements;
the plurality of circumferentially aligned wedge plate segments includes a plurality of pairs of the circumferentially aligned wedge plate segments;
each pair of the circumferentially aligned wedge plate segments includes a first wedge plate segment and a second wedge plate segment;
to transition from the locked mode to the unlocked mode, the activation assembly is arranged to displace the first wedge plate segment and the second wedge plate segment for said each pair of the circumferentially aligned wedge plate segments circumferentially toward each other; and,
to transition from the unlocked mode to the locked mode, the plurality of resilient elements is arranged to displace the first wedge plate segment and the second wedge plate segment for said each pair of the circumferentially aligned wedge plate segments circumferentially away each other.

13. The self-contained switchable wedge plate clutch of claim 12, wherein:
the clutch assembly includes a plurality of first ramps and a plurality of second ramps;
each first wedge plate segment includes a third ramp in contact with a respective first ramp; and,
each second wedge plate segment includes a fourth ramp in contact with a respective second ramp.

14. The self-contained switchable wedge plate clutch of claim 13, wherein the outer race includes the plurality of first ramps and the plurality of second ramps.

15. The self-contained switchable wedge plate clutch of claim 13, wherein to switch between the locked mode and the unlocked mode for the self-contained switchable wedge plate clutch, the activation assembly is arranged to slide:
each third ramp along the respective first ramp; and,
each fourth ramp along the respective second ramp.

16. A self-contained switchable wedge plate clutch, consisting of:
a housing including:
at least one first through-bore; and,
a second through-bore;
a space enclosed by the housing; and,
a clutch assembly including:
an outer race non-rotatably connected to the housing;
an output hub:
at least a portion of which is disposed within the space; and,
arranged to connect to an output shaft;
a plurality of circumferentially aligned wedge plate segments:
an entirety of which is located within the space; and,
radially disposed between the outer race and the output hub; and,
an activation assembly:
including an activation component engaged with the plurality of circumferentially aligned wedge plate segments; and,
at least a portion of which is located within the space, wherein:
the activation assembly is arranged to displace the plurality of circumferentially aligned wedge plate segments to switch the self-contained switchable wedge plate clutch between:
a locked mode for the self-contained switchable wedge plate clutch, in which the housing and the output hub are non-rotatably connected; and,
an unlocked mode for the self-contained switchable wedge plate clutch, in which the housing and the output hub are rotatable with respect to each other; and,
an entirety of the output hub is disposed within the space and the output shaft is arranged to pass through the second through-bore; or,
the output hub includes a portion disposed in the second through-bore.

17. The self-contained switchable wedge plate clutch of claim 16,
wherein the housing includes an input part arranged to receive rotational torque, and the activation component includes a plurality of engagement elements interleaved with the plurality of circumferentially aligned wedge plate segments; and,
wherein:
the activation component includes a portion extending through the at least one first through-bore; and,
the only openings through the housing and into the space are the at least one first through-bore and the second through-bore; or,
wherein:
the activation component includes a portion extending through the at least one first through-bore;
the input part includes a third through-bore arranged for connection to an input shaft transmitting the rotational torque; and,
the only openings through the housing and into the space are the at least one first through-bore, the second through-bore, and the third through-bore; or,
wherein:
the activation component is arranged to connect to an actuator extending through the at least one first through-bore; and,
the only openings through the housing and into the space are the at least one first through-bore and the second through-bore; or,
wherein:

the activation component is arranged to connect to an actuator extending through the at least one first through-bore;

the input part includes a third through-bore arranged for connection to an input shaft transmitting the rotational torque; and, the only openings through the housing and into the space are the at least one first through-bore, the second through-bore, and the third through-bore.

18. The self-contained switchable wedge plate clutch of claim 16, wherein:

the outer race includes a plurality of first ramps and a plurality of second ramps;

the plurality of circumferentially aligned wedge plate segments includes:
 a plurality of first wedge plate segments; and,
 a plurality of second wedge plate segments;

each first wedge plate segment includes a third ramp in contact with a respective first ramp;

each second wedge plate segment includes a fourth ramp in contact with a respective second ramp; and, to switch the self-contained switchable wedge plate clutch between the locked mode and the unlocked mode, the activation assembly is arranged to circumferentially slide:
 each third ramp along the respective first ramp; and,
 each fourth ramp along the respective second ramp.

19. A self-contained switchable wedge plate clutch, consisting of:

a housing including:
 a first through-bore arranged to receive an input shaft;
 at least one second through-bore; and,
 a third through-bore; and, a clutch assembly including:
 an input part arranged to connect to the input shaft;
 an outer race formed by the housing, the outer race including:
  a plurality of first ramps; and,
  a plurality of second ramps;
 an output hub:
  enclosed by the housing and arranged to non-rotatably connect to an output shaft passing through the third through-bore; or,
  including a portion disposed in the third through-bore and arranged to non-rotatably connect to an output shaft;
 a plurality of circumferentially aligned wedge plate segments:
  enclosed by the housing; and,
  including:
   a plurality of first wedge plate segments, each first wedge plate segment including a third ramp in contact with a respective first ramp; and,
   a plurality of second wedge plate segments, each second wedge plate segment including a fourth ramp in contact with a respective second ramp; and,
 an activation assembly including:
  an activation component:
   with a plurality of activation elements circumferentially interleaved with the plurality of circumferentially aligned wedge plate segments; and,
   extending through the at least one second through-bore; and,
  a resilient element, wherein:

the only openings in the housing are the first through-bore, the at least one second through-bore; and the third through-bore; and, to switch the self-contained switchable wedge plate clutch between a locked mode for the self-contained switchable wedge plate clutch, in which the housing and the output hub are non-rotatably connected, and an unlocked mode for the self-contained switchable wedge plate clutch, in which the housing and the output hub are rotatable with respect to each other:

the resilient element is arranged to displace the activation component and the plurality of activation elements in a first axial direction parallel to an axis of rotation for the housing; and, the activation component is arranged to receive a force from an actuator to displace the activation component and the plurality of activation elements in a second axial direction, opposite the first axial direction.

20. The self-contained switchable wedge plate clutch of claim 4, wherein:

the housing includes a second through-bore arranged to receive an output shaft;

the output hub is arranged to non-rotatably connect to the output shaft;

the only openings through the housing are the at least one first through-bore and the second through-bore; and, at least a portion of the activation component is located within the housing, and the activation component is arranged to receive a force from an actuator to switch the self-contained switchable wedge plate clutch between the locked mode and the unlocked mode; or, the activation assembly is arranged to receive a force from an actuator to switch the self-contained switchable wedge plate clutch between the locked mode and the unlocked mode.

\* \* \* \* \*

UNITED STATES PATENT AND TRADEMARK OFFICE
CERTIFICATE OF CORRECTION

PATENT NO. : 10,663,009 B2
APPLICATION NO. : 16/036987
DATED : May 26, 2020
INVENTOR(S) : Brian Lee

Page 1 of 1

It is certified that error appears in the above-identified patent and that said Letters Patent is hereby corrected as shown below:

In the Claims

Column 13, Line 4, "claim 8" should be --claim 1--

Signed and Sealed this
Fourth Day of August, 2020

Andrei Iancu
*Director of the United States Patent and Trademark Office*